(12) United States Patent
Voehringer

(10) Patent No.: US 7,523,584 B2
(45) Date of Patent: Apr. 28, 2009

(54) WEATHER PROTECTION DEVICE FOR THE PROTECTION OF SPECIAL PLANT CULTURES SENSITIVE TO MOISTURE

(76) Inventor: Reinhard Voehringer, 1, Aichach, 88276 Berg (DE)

( * ) Notice: Subject to any disclaimer, the term of this patent is extended or adjusted under 35 U.S.C. 154(b) by 0 days.

(21) Appl. No.: 10/451,841

(22) PCT Filed: Oct. 30, 2002

(86) PCT No.: PCT/DE02/04043

§ 371 (c)(1),
(2), (4) Date: Jul. 13, 2004

(87) PCT Pub. No.: WO03/037070

PCT Pub. Date: May 8, 2003

(65) Prior Publication Data

US 2004/0244284 A1 Dec. 9, 2004

(30) Foreign Application Priority Data

Oct. 31, 2001 (DE) ................................ 101 53 703

(51) Int. Cl.
*A01G 13/02* (2006.01)
(52) U.S. Cl. ........................................................ 47/29.1
(58) Field of Classification Search ................ 47/20.1, 47/22.1, 24.1, 29.1, 29.5, 31, 31.1
See application file for complete search history.

(56) References Cited

U.S. PATENT DOCUMENTS

| 2,741,874 | A | * | 4/1956 | Denning | 47/25.1 |
| 3,028,872 | A | * | 4/1962 | Cresswell | 135/94 |
| 4,068,404 | A | * | 1/1978 | Sheldon | 47/22.1 |
| 4,285,162 | A | * | 8/1981 | Hilton | 47/29.1 |
| 4,313,279 | A | * | 2/1982 | Greenbaum | 47/29.1 |
| 4,416,928 | A | * | 11/1983 | Carl | 428/38 |
| 4,487,212 | A | * | 12/1984 | Moore | 135/90 |
| 4,804,008 | A | * | 2/1989 | Ryder et al. | 135/33.7 |
| 4,821,785 | A | * | 4/1989 | Rolan | 150/166 |
| 5,487,401 | A | * | 1/1996 | Johnson et al. | 135/33.7 |
| 2004/0118039 | A1 | * | 6/2004 | Hinsperger | 47/31.1 |
| 2005/0072043 | A1 | * | 4/2005 | Nieuwoudt | 47/31 |

FOREIGN PATENT DOCUMENTS

DE    GM 7514453    9/1975

(Continued)

*Primary Examiner*—Francis T Palo
(74) *Attorney, Agent, or Firm*—McKenna Long & Aldridge LLP

(57) ABSTRACT

A weather protection device for the protection of moisture or sunlight sensitive specialized cultures of plant cultivation is proposed, with at least a largely watertight protective skin that is attached to a carrier unit, which safely ensures an effective protection, especially of plants from weather influences, even over longer periods of time at comparably low effort, and which is economically inexpensive to produce, especially for very large-scale applications, such as for areas of several acres of size: This is achieved according to the invention in that the protective skin is attached at least partially pivoting on the carrier unit for swiveling out by means of wind force from an idle position, and that at least one of a net, meshwork, and screen is provided, on which the protective skin rests.

13 Claims, 2 Drawing Sheets

FOREIGN PATENT DOCUMENTS

| | | | |
|---|---|---|---|
| DE | 3137332 A1 * | 6/1982 |
| DE | 3504133 A1 | 8/1986 |
| DE | 4318678 A1 | 12/1993 |
| DE | 29711346 U1 | 12/1998 |
| DE | 19950978 A1 | 4/2001 |
| DE | 10013545 A1 | 9/2001 |
| EP | 0771140 B1 | 2/1996 |
| EP | 898878 A1 * | 3/1999 |
| EP | 771140 B1 * | 5/2000 |
| EP | 1 094 174 A1 | 10/2000 |
| EP | 1094174 A1 * | 4/2001 |
| FR | 2474570 A1 | 7/1981 |
| FR | 2598881 A1 * | 11/1987 |
| FR | 2678805 A1 * | 1/1993 |
| GB | 2333683 A * | 8/1999 |
| JP | 03285620 A * | 12/1991 |
| JP | 09023763 A * | 1/1997 |
| JP | 09056269 A * | 3/1997 |
| JP | 10227133 A * | 8/1998 |
| JP | 10238127 A * | 9/1998 |
| JP | 2004143809 A * | 5/2004 |
| JP | 2005330756 A * | 12/2005 |
| SU | 1360645 A * | 12/1987 |
| SU | 1644815 A * | 4/1991 |

* cited by examiner

WEATHER PROTECTION DEVICE FOR THE PROTECTION OF SPECIAL PLANT CULTURES SENSITIVE TO MOISTURE

BACKGROUND OF THE INVENTION

This application claims the benefit of International Patent Application No. PCT/DE02/04043, filed on Oct. 31, 2002, which claims benefit of German Patent Application No. 101 53 703.4, filed on Oct. 31, 2001, which are hereby incorporated by reference for all purposes as if fully set forth herein.

The invention relates to a weather protection device for the protection of moisture or sunlight-sensitive specialized cultures of plant cultivation according to the generic term of claim 1.

DISCUSSION OF THE RELATED ART

Moisture-sensitive specialized cultures, such as cherries, apricots, raspberries, strawberries, grapes, etc., for instance, may be substantially damaged by rainfall, especially during the last days before the harvest. Cherries, for example, absorb so much water during a rainfall that they may burst, and can therefore no longer be sold as dessert fruit. Correspondingly, these cases result in substantial economic losses for agriculturists.

To avoid the economic losses corresponding to destruction of harvests from rain, various weather protection devices are already in use. For example, conventional weather protection devices contain posts on which tension wires are stretched in such a way that, for instance, so-called hail protection nets and/or foils, tarps, and such can be attached to this type of carrying unit. Especially for the protection of rows of cherry trees, the hail nets, or foils are arranged in the form of rows of span roof constructions over the plant rows. The hail net is usually attached over the plant during comparably long periods of time for the protection of the plants from hail. In contrast, the slack foil, or tarp, is stretched over the plants merely a few days before the harvest of the fruit, or such. During the time where plants do not need to be protected from rain, the foils, or tarps, can possibly be folded, or rolled up, and stored in the ridge area of the protection device. For example, a plant protection device comparable to, and constituting a special category with the respective rain protection system, is known from the European Patent Specification EP 07 71 140 B1.

However, a disadvantage of the currently known weather protection devices is that comparably strong winds, or gusts of wind, may lead to damage, or even the destruction of the wind and water-tight protective skin that has a relatively large surface in its stretched out state, or of the entire weather protection device. This results in substantial financial damages for agriculturists. Furthermore, protection of the plants from weather exposure is no longer ensured after the weather protection device has been damaged or destroyed.

SUMMARY OF THE INVENTION

The task of the invention is to recommend a weather protection device for the protection of moisture or sunlight-sensitive specialized cultures of plant cultivation with at least one essentially water-tight protective skin that is attached to a carrier unit, which ensures effective protection, particularly for plants, from weather exposure, even over longer periods of time at a comparably low effort.

This task, based on a weather protection device of the type previously mentioned in the introduction, is solved by the characteristics of claim 1.

Advantageous embodiments and further embodiments of the invention are possible by means of the measures stated in the sub-claims.

Accordingly, a weather protection device according to the invention is characterized in that the normally slack flexible protective skin is attached on the carrier unit in at least a partially pivoting position for the swiveling out by means of wind force from an idle position, and that at least a net, meshwork, and/or screen is provided, on which the protective skin lies. Preferably, at least part of the carrier unit is comprised of at least a net, meshwork, and/or screen that is embodied as an overlay for the protective skin, on which the protective skin covers essentially the complete surface. This is of particular advantage with slack foils, tarps, etc., as these are commercially available in many variations, and are especially inexpensive. Additionally, they are already in broad use in plant cultivation, especially in agriculture.

In large-scale weather protection devices in plant cultivation according to prior art, an attempt is made by means of extensive, constructive measures, to embody the protective skin or slack foil in such a way that it resists the forces of wind. This results in substantial constructive and financial efforts on one hand, but a safe protection from extreme winds or gusts of wind can still not be ensured, on the other hand. Contrary to prior art, the protective skin according to the invention is embodied in such a way that it yields to the wind forces across essentially its entire surface in an advantageous manner, in that at least one area of the protective skin swivels out when exposed to a certain surface pressure, and as such positions itself into the wind. This means that the protective skin yields to wind pressure in a specific manner through the working surface of the protective skin that is decisive for the wind is critically reduced. This results in the protective skin being for the largest part protected from negative influences, or destruction, even in the case of relatively large surfaces.

Due to the comparatively small working surface of the protective skin, the protective skin, or the weather protection device respectively, absorbs comparatively low wind forces. Accordingly, relatively complex constructive measures for the absorption of extreme wind forces can be omitted with regard to the protective skin, as well as with regard to the carrier unit, which also substantially reduces the constructive and financial burden in weather protection devices according to the invention, especially in relatively large-scale applications.

A respective negative influence or destruction is basically safely avoided through the swiveling out of the protective skin by means of wind force, but at the same time rain falling on the specialized cultures is avoided as much as possible with the aid of the protective skin in the idle position. When it rains, slight winds also generally occur, at least in mild climate zones.

Advantageously, the net, meshwork, and/or screen embodied as the overlay of the protective skin in particular makes it possible for the protective skin to lie nearly on the complete surface of the net, meshwork, and/or screen in its idle position, i.e., during a calm. On one hand, this aids in the particularly simple creation of the surface-wide support of the protective skin, so that an extraordinarily economically favorable weather protection device especially for relatively large-scale applications, such as in plant cultivation, can be realized. On the other hand, a particularly thin-walled, slack, pliable, flexible, elastic, or formable protective skin can be used, such as a plastic foil or tarp, without it requiring any extensive support or such.

Furthermore, extreme overheating of the area of the weather protection device to be protected is effectively avoided in an advantageous manner by means of a protective skin according to the invention. A relatively strong heating of the area to be protected leads to convection flows, i.e., to thermal winds that may also result in a swiveling out of the protective skin according to the invention, and can therefore result in the realization of an advantageous ventilation. Any negative influences on the plants, or objects to be protected, from relatively high temperatures can therefore be effectively avoided.

Furthermore, the protective skin according to the invention can for instance be applied over a course of several months without it being damaged due to wind. In plant cultivation it is advantageous in a weather protection device according to the invention to provide artificial irrigation that supplies the plants to be protected with water. For example, irrigation occurs at a height of several centimeters above ground, for instance, at approximately 10 to 50 cm, especially 20 cm.

Relatively warm water, for instance, approximately 5° to 15° C. can preferably be introduced underneath the protective skin. This makes it possible for the irrigation water to transfer warmth to the interior formed by the weather protection device, and the plants or such to be protected are protected from adversely low temperatures such as frost. This means that the weather protection device can be assembled together with an irrigation system as a frost protection device, heating device, or heating and/or air conditioning of the plants to be protected.

Furthermore, protection from birds and/or insects is achieved, especially due to the nearly continuous, at least slight movement of the protective skin, and/or of the net, meshwork, or screen, respectively. Preferably, the net essentially reaches the ground on the side. For purposes of an insect protection function, the net, meshwork, and/or screen, by comparison has no clearance or holes, so that common insects usually are not able to penetrate the net, meshwork, and/or screen. A further advantage, in the case of fruit trees, berry hedges, grapes, strawberries, etc. to be protected, is that birds and/or insects damaging the plants, such as cherry fruit flies, or such, are effectively deterred from influencing the harvest. A weather protection device according to the invention embodied as bird and/or insect protection ensures an especially high harvest rate of the plants to be protected. Additionally, this may be considered or used as a biological plant protection measure, which can largely replace the use of chemical plant protective agents or their equivalents.

Generally, for the pollination of the plants to be protected, bees or beehives, for instance, can be attached in an advantageous manner between them, or underneath the protective skin and/or inside of the inventive weather protection device.

A further advantage is that due to the weather protection device according to the invention, the leaves of the plants to be protected almost never get moist or wet, so that an adverse infestation of the plants with fungus, or such can be effectively avoided. Accordingly, the use of fungicides, in particular, becomes largely obsolete. In this way, biological plant protection can be realized in an advantageous manner, thus making respective chemical means dispensable.

Advantageously, the protective skin is embodied in such a way that a minimum wind force that can be predetermined is required for the swiveling out of the protective skin from the idle position. This can be realized, for instance, with attenuation means for attenuating the swiveling out, and/or by means of an advantageous dimensioning, particularly of the weight, of the protective skin to be swiveled out.

In a favorable manner, the protective skin can generally be attached, i.e., sewn, or glued onto the net, meshwork, and/or screen. Respective attachments can be realized for large-scale use in a particularly simple way, such as for protective skin that is several square yards or acres in size, which is common in agriculture or forestry.

In construction, weather coverings for scaffolding erected for cladding work are known that have a carrier frame attached to a rain gutter of a building, whereby surface-rigid flaps are attached on the narrow ends of their frame spars (compare DE 199 50 978 A1, DE 100 13 545 A1). Due to the requirements and conditions in construction, both the carrier frames and the flaps of this type of weather coverings must be embodied in an especially robust or rigid manner so that the flaps according to the mentioned specifications are generally realized in multi-layers, and are additionally equipped with stiffening members.

These devices, however, have the disadvantage that the carrier frame and the stiffened, especially multi-layered flaps are very complex and cost intensive, or time consuming in their production, as well as in their assembly and disassembly. Therefore, these types of weather coverings are merely suitable in scaffolding for smaller areas, such as for covering scaffolding toward the top. Due to the current economic conditions, if for no other reason, weather coverings in plant cultivation having complex and numerous spars, or such, cannot be utilized because of their high costs.

In a preferred variation of the invention, the protective skin is at least partially embodied in a manner of a vane. This results in a particularly simple and inexpensive embodiment of the invention.

Advantageously, the protective skin is comprised of several, at least partially pivoting protective elements. For example, at least one protective element can be provided per roof surface, and/or lateral area of the weather protection device so that the weather protection device can be embodied in any shape, such as an umbrella, pyramid, cone, hemisphere shape, or such, and can possibly be adjusted to the objects to be protected, or their shape, respectively.

Furthermore, each roof, or side surface, or such, can be comprised in a favorable manner of several pivoting protective elements according to the invention. This makes it possible that any relatively large surfaces can be created, or protected with comparably easy to handle, small-surface protective elements. Possibly, surfaces or areas to be protected of several acre size can be realized by means of utilization of several pivoting protective elements according to the invention, for instance, for protecting complete plantations, or such.

Preferably, several protective elements each are embodied at least partially as vanes. With this type of help, relatively large protection areas can be embodied according to the invention in a particularly simple manner.

In a special embodiment of the invention, the protective elements are arranged overlapping each other, i.e., a surface-wide covering of the protective elements is provided. In a preferred manner, the overlapping is realized in such a way that a second element that is arranged above a first protective element in vertical direction overlaps the exterior of the first protective element across the entire surface. This makes it possible that rainwater drains on the exterior of the protective skin in the protective skin's idle position, and the objects arranged underneath the weather protection device are effectively protected from the rain. Alternatively, this measure realizes a steadily predetermined idle position by means of a support, or embodiment of an end stop for the second protective element by means of a section of the first protective element in an advantageous manner.

In a special variation of the invention, the protective skin, or the protective elements can be embodied as nearly stiff elements, which are, for example, pivot-supported around a pivot axis. For this purpose, sheet metal, plastic plates, or such are possible, for instance. Among others, the pivoting operation can be realized by means of hinges or such.

Preferably, the protective skin is embodied at least partially as a thin-walled, slack, pliable, formable, elastic, or flexible protective skin. For example, the pivot area of the protective elements, or of the protective skin, can be embodied by means of a flexible section in the manner of a foil hinge. Any rigid plates according to the invention can be attached on the carrier unit in a pivoting manner by means of a bendable section of the protective skin.

As an alternative, the protective skin, or the protective elements, respectively, can be embodied almost completely as a flexible foil, tarp, or such. In an advantageous manner, particularly with the use of foils, tarps, or such, the protective skin can be adjusted to various different shapes, and at the same time embodied in a pivoting manner. For instance, a flexible protective skin can be attached to the carrier unit in a pivoting manner according to the invention both in the case of nearly plane surfaces, and in the case of cone or cylinder shaped surfaces, or ball sections.

In an advantageous embodiment of the invention, the length equals a multitude of the width of a protective element. For example, a protective element and/or the net, screen, fabric, meshwork, etc. is embodied in a strip or sheet shape. Correspondingly narrow protective elements and/or nets, screens, fabrics, meshwork, etc. can be attached in an advantageous manner lengthwise along the longitudinal axis, or longitudinal edge, especially on the carrier unit. This creates a comparably large-scale attachment that is able to receive relatively large retaining forces. Furthermore, an advantageous adjustment to relatively large planting areas of respective plants can be achieved in this manner.

Additionally, a nonconforming positioning of the protective skin can be effectively avoided by means of comparably narrow protective elements that are correspondingly attached lengthwise, especially with the use of a flexible protective skin.

One length of each of the protective elements and/or the nets, screens, fabrics, meshwork, etc. is possibly approximately 10 to 1000 times, preferably approximately 100 to 500 times longer than its width.

It is possible that a pivot line of the protective skin extends in a nearly vertical direction. In a preferred embodiment of the invention, at least one pivot line of the protective skin extends essentially horizontally. For example, merely one nearly horizontally extending pivot line of the protective skin, or of the protective elements can be provided, which is possibly combined with one or several, at least partially vertically extending pivot lines. For instance, a strip-shaped pivot element is essentially horizontally pivot-attached to the carrier unit, preferably in longitudinal direction. This can, among other uses, be attached to the carrier unit, possibly in a lateral direction, with the use of a flexible protective skin, or flexible protective elements, respectively. In this case, the flexible protective skin enables a partial swiveling out according to the invention despite multiple attachments.

In accordance with the invention, an edge, or an edge section of the protective skin, or of the protective elements, respectively, is preferably loosely attached to the carrier unit, i.e., is not fastened or attached to the carrier unit so that at least this edge, or this edge section, respectively, can blow in the wind.

In an advantageous variation of the invention, return means are at least provided in order to return the swiveled out protective skin, or the protective elements, respectively, into the idle position. Corresponding return means particularly enable the formation of a largely closed protective skin during nearly calm or windless phases. This means that the protective skin is nearly impermeable for falling rain and/or possibly for direct sunlight. As a result, the objects to be protected, such as cherry trees, raspberry hedges, or such, are exposed to rain and/or sunlight merely during comparably heavy winds. A relatively short-term, or low irrigation with rainwater is irrelevant particularly in the case of cherries, or similar fruits.

Furthermore, the invention makes it possible that comparably sunlight-sensitive objects, or cultures of plant cultivation are effectively protected from very strong sunlight also on a long-term basis, and that damage of the protective skin is effectively avoided at the same time, even during relatively heavy winds.

Generally, the pivot line of the protective skin, or of the protective elements, respectively, can be provided in a center section of the same. Preferably, the pivot line is arranged at an edge area of the protective skin and/or of the protective elements. Possibly, the protective elements, or the protective skin, flap or pivot back into the idle position up to an end stop element of the carrier unit nearly automatically. Especially by using a pivot line that is arranged in the edge area the protective skin, or the protective elements can, due to gravity, advantageously pivot back automatically, and therefore act as, or be realized as return means at the same time. This enables a particularly simple realization, and therefore inexpensive embodiment of the invention.

As an alternative, or in combination herewith, the return means are comprised of at least one attachment element for the additional attachment of the protective skin on the carrier unit. For example, an elastic return element, such as a rubber or spring element, or such can be used as the attachment element.

Furthermore, a nearly non-elastic attachment can be provided on the carrier unit, especially with the use of a flexible protective skin.

In a preferred manner, the carrier unit is comprised of at least one support device that is arranged on the carrier element for the support of the protective skin. For example, the carrier element can be realized as a pole, post, or such, on which a respective support device is arranged for the support of the protective skin. The carrier element is to be embodied in such a way that the objects to be protected, such as cherry trees, can be arranged in an advantageous manner underneath the protective skin, or within the area to be protected. The support device especially, enables an advantageous support, or fixation of the protective skin's idle position.

Preferably, the support device has at least the net, meshwork, screen, and/or clamping elements. Preferably, the support device is embodied as the support for the protective skin. For example, the support device can be embodied as the hail protection net that exists in many cases and is attached or tautened to poles, posts, etc. by means of tension wires, tension ropes, or such. Respective hail protection nets can be realized at substantially lower costs as compared to current rain protection devices according to prior art, and are widely used for respective specialized cultures in plant cultivation. By using the existing hail protection systems as the support device and carrier unit for the protective skin according to the invention, an especially economically favorable embodiment can be achieved.

In an advantageous embodiment of the invention, the protective skin is at least partially attached to the support device by means of a thread, yarn, rope, and/or wire. Particularly the attachment by means of a sewing method with the aid of a respective thread, yarn, or such, enables a particularly advantageous attachment on the carrier unit that can easily be realized, for instance with the use of comparably narrow, strip-shaped protective elements, especially in the longitudinal direction of the protective skin, or the protective elements, respectively.

Furthermore, the protective skin, or the protective elements, respectively, can be attached on the carrier unit in an advantageous manner by means of gluing, plastic welding, riveting, stapling, clamping methods, or such.

Preferably, the protective skin consists at least partially of light permeable material, such as a nearly lucent plastic foil, or such. This measure makes it possible that the protective skin can be attached on the carrier unit according to the invention over comparably long periods of time without any adverse shading of the plants, or such. This means that, for instance, cherries, raspberries, etc. receive sunlight even over longer periods of time, such as several weeks or months, preferably for their continued ripening, without any adverse rain reducing the effectiveness of the protection.

Preferably, a nearly lucent protective skin, or plastic foil is used that contains stiffening means, or an insert for stiffening. The stiffening means, or the insert can, for instance, is embodied as a fabric, or such, so that commercially available plastic foils can be used as the protective skin according to the invention.

It is additionally possible that a material with filter effect can be used as the material for the protective skin for special radiation ranges of the sunlight, such as UV rays. It is possible to use a material that transforms adverse UV rays into favorable IR, or thermal rays. This measure advantageously influences the plant growth, particularly photosynthesis. Additionally, this method effectively counteracts the recent, and probably future increase of UV rays of sunlight due to a thinning of the ozone layer, which reduces or completely avoids respective damages to plants.

Furthermore, UV resistant material can be provided as the protective skin in an advantageous manner so that particularly the life of the protective skin possibly spans several years.

In a special embodiment of the invention, the protective skin, and/or the net, fabric, or screen contains a blanket-stitched edge, or inseam side strip. Preferably, the blanket-stitched edge, or the inseam side strip is arranged at least on the side of the protective skin that is opposite of the pivot line. This achieves both a stiffening of the protective skin, and a weight increase of the protective skin, which further improves the swiveling out, or the return of the protective skin. The blanket-stitched edge of the net, fabric, etc. can realize the function of edge reinforcement, or the bordering, particularly in sewing processes.

In an advantageous embodiment of the invention, the protective skin is embodied, possibly exclusively, as a roof. Especially for the use in plant cultivation, merely the arrangement of the protective skin in the roof area of the weather protection device suffices in order to ensure the protection from rain. By omitting side areas of the weather protection device that are covered with protective skin, the construction, and therefore also the financial efforts for the embodiment of the inventive weather protection device is reduced.

In a special further development of the invention, at least one weather protection strip is provided that consists of a protective skin strip attached to a strip of net, fabric, or screen. Preferably, the attachment is performed by means of a sewing process, or such. Corresponding weather protection strips are attached, or sewn to each other so that a weather protection device is comprised of several weather protection strips.

The attachment, or seam, is advantageously performed in such a way that the individual weather protection strips are attached, or sewn to the attachment, or seamed with the net, fabric, or screen strip of the neighboring weather protection strip. Preferably, this is also performed in such a way that an overlapping of the individual protective skin strips is realized. This means that the lower longitudinal edge of one strip overlaps the upper longitudinal edge of the subsequently lower lying protective skin strip. For example, the net, fabric, or screen strip, for instance, in its sewn condition, has for this purpose a lower stretch, or width than, that of the respective protective skin strip.

The net, fabric, or screen strip, however, can also have a larger stretch, or width than the respective protective skin strip in the attached condition so that a rainwater permeable area is created, in which generally only the net, fabric, or screen is present. A respective area can, among others, be provided at an edge area of the weather protection device, or particularly in the case of a weather protection device embodied in the shape of a gable roof, or such in a center or lower lying area. Especially in the latter case, this aids in the advantageous realization of a drainage area for the rainwater so that it can drain particularly easily and without any obstacles, and therefore the retention of water does not occur on the protective skin.

Preferably, the drainage area is arranged between the plants, plant rows, or objects to be protected. This prevents the leaves or fruit generally from getting wet, and ensures that rainwater is fed to the roots of the plants to be protected so that an artificial irrigation can possibly be omitted, or reduced. Furthermore, this measure aids in direct sunlight being directed underneath the protective skin, or to the plants at the correct dosages.

In an advantageous embodiment of the invention, the weather protection device has at least one weather protection strip that is attached, or sewn together on two opposite side, especially longitudinal sides. The two other sides, especially short sides, are usually not attached, or sewn together. Favorably, a weather protection strip that is arranged on an edge, especially on the upper edge, is embodied accordingly. Its stretch, or width is possibly smaller than that of the remaining, or average weather protection strips so that its working surface for the wind is comparably small. Otherwise, only protective skin strips that are attached on one side can possibly completely tilt back beyond an edge area, for example the ridge edge of a roof-shaped weather protection device, i.e., beyond 180 degrees, so that a possibly automatic swiveling back into the idle position is no longer ensured. The second attachment bordering the one-sided attachment of the protective skin strip that is attached on both sides on the net, etc., is preferably performed by means of attaching the neighboring, bordering weather protection strip.

Generally, it is possible that a protective skin that is attached at least partially pivoting on a carrier unit for the swiveling out by means of wind force from its idle position can, according to the invention, also be advantageously used for sun umbrellas, tents, pavilions, or other protective roof systems. An inventive protective skin can also be used in construction, particularly for the manufacture of stables for animals, or for encasements of construction scaffolding, etc. In addition to the roof area, the protective skin can also be advantageously arranged on at least one or several sides of the respective building, scaffolding or such for this purpose.

BRIEF DESCRIPTION OF THE DRAWINGS

An embodiment example of the invention is illustrated in the drawing, and is explained in detail in the following figures.

They show in detail.

DETAILED DESCRIPTION OF THE PREFERRED EMBODIMENTS

Figure 1:
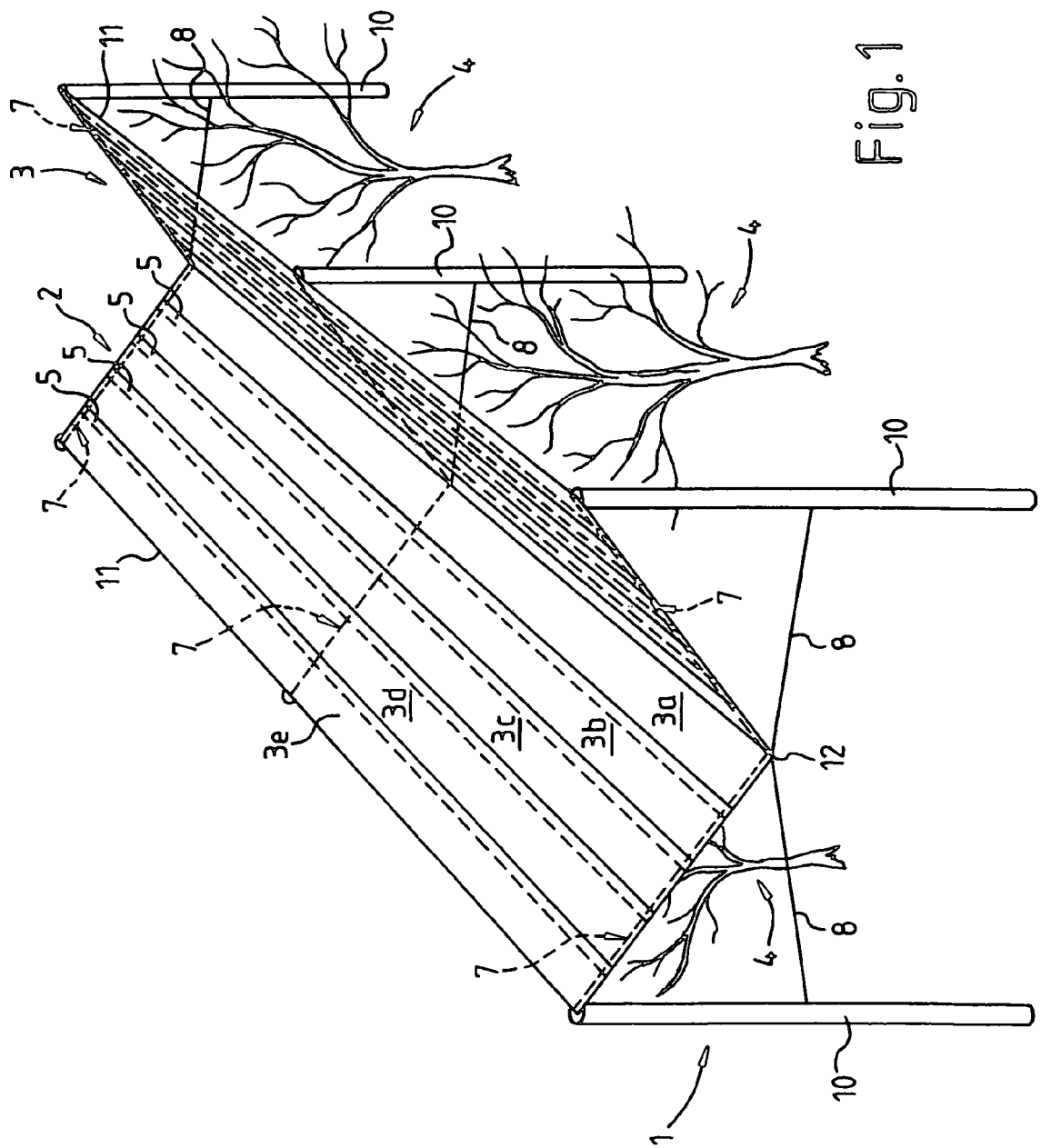
FIG. 1 is a perspective schematic illustration of a weather protection device according to the invention in a rain, or idle phase.

FIG. 1 schematically illustrates a weather protection device according to the invention with a carrier unit 1 and a protective skin 2. The protective skin 2 consists of several sheets 3*a, b, c, d, e*, which are essentially aligned lengthwise along a row of plants 4.

The sheets 3*a, b, c, d*, 3 each have an overlap 5. According to FIG. 1, the not visible upper edge of the interior sheet 3 is illustrated as a broken line, and the lower edge of the upper sheet 3 that overlaps the lower sheet 3 on its exterior is schematically illustrated as a solid line.

In the edge area of the broken line, or on the upper edge of the sheet 3 when viewed in vertical direction, the sheets 3*a, b, c, d, e* are attached on tension wires 11, or on a support device not illustrated in FIG. 1 preferably by means of a seam, by gluing, or such. This attachment is not illustrated for reasons of clarity. Each sheet 3 can possibly be attached to a separate tension wire.

The protective skin 2, or the sheets 3, are made of a flexible foil or such, so that a pivoting of the protective skin 2, or of the sheets 3 around an essentially horizontally aligned pivot area, or a respective pivot line by means of the previously described attachment.

Figure 2:
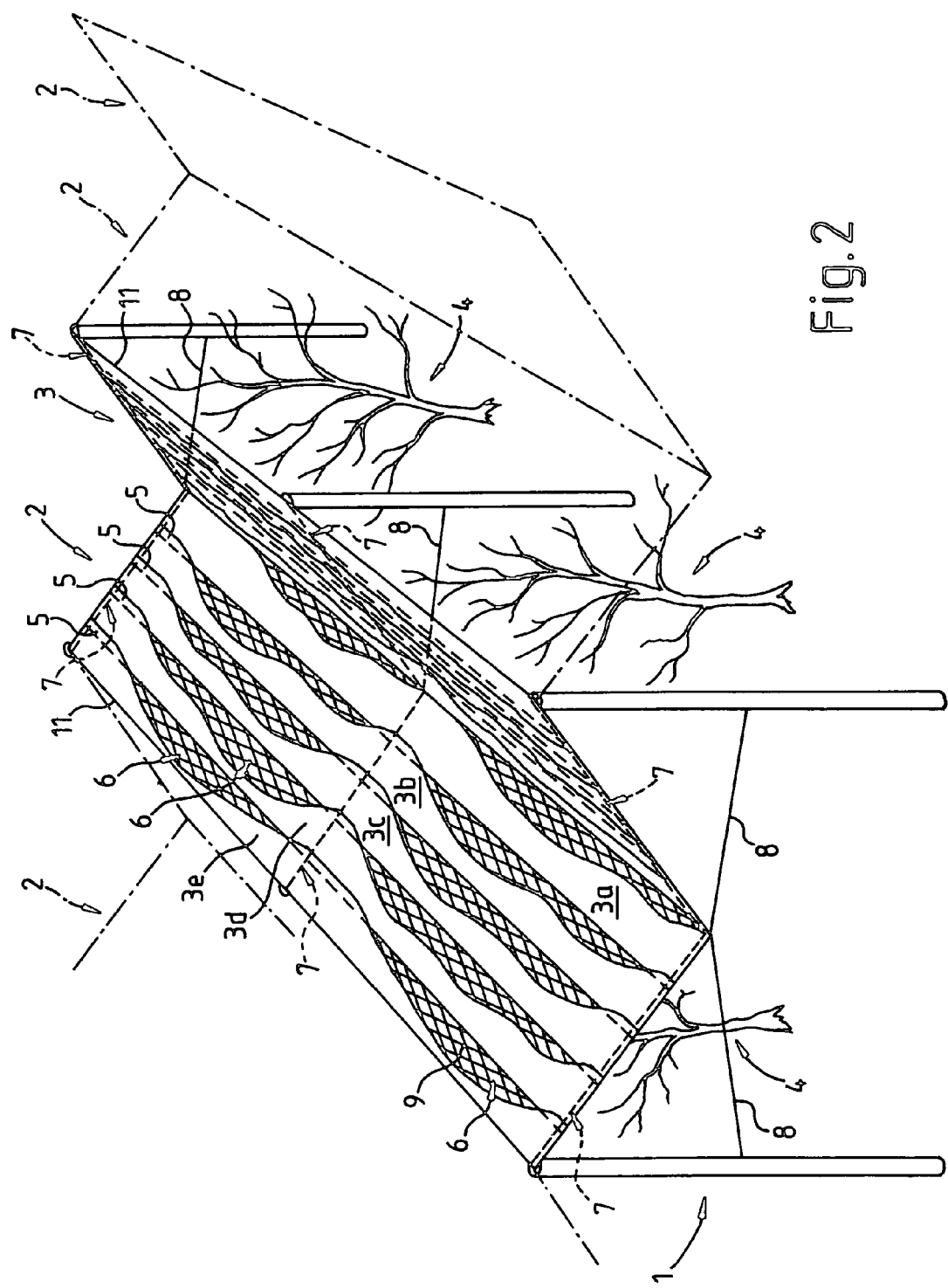
FIG. 2 is a perspective schematic illustration of the weather protection device according to the invention in a wind, or thermal phase.

FIG. 2 shows the weather protection device according to FIG. 1 during a wind or thermal phase. This makes it clear that by means of winds, or by means of wind created by thermal flows, the protective skin 2, or the sheets 3*a, b, c, d*, e is swiveled along the previously described swivel line around the upper edge area of the protective skin 2, or the sheets 3.

In the partially swiveled out position according to FIG. 2, openings 6 are created in the protective skin 2 so that atmospheric air can flow through the protective skin 2. This causes especially the effective working area of the protective skin 2 for the wind, or the flowing atmospheric air to be substantially reduced so that the protective skin 2 is not adversely affected, or torn, or even completely destroyed during winds, or during a storm.

This is particularly contrary to prior art, whereby respective weather protection devices have a continuous foil, or such, as the protective skin, and they are to resist wind forces by means of comparably complex, as stable as possible, and multiply stretched protective skins. In the case of protective skins according to prior art, experience has shown that comparably heavy storms, or gusts of wind destroy the same so that, for instance, the agriculturist experiences substantial financial damages both with regard to the destroyed protection system, and with regard to possibly destroyed cherries, or such.

Through the use of a comparably simple, inexpensive, flexible protective skin 2, or sheets 3 according to the invention, a weather protection device can be realized that can be achieved with minimal construction effort, or financial expenditure, as opposed to prior art.

Due to the overlap 5, the idle position of the protective skin 2, or of the sheets 3 illustrated in FIG. 1 particularly ensures that rain falling on the weather protection device drains along the protective skin 2, or possibly from sheet 3*e* over sheet 3*d*, etc. until sheet 3*a*, and drips, or drains possibly between the plants 4 onto the ground. As an alternative, for instance, sheet 3*a* can be largely continuously connected to the neighboring, not detailed sheet 3 of the opposite roof area so that they form a type of rain gutter, which causes the rain gutter of the protective 2 to have an incline by means of a respectively advantageous stretching device 8, and rainwater can drain correspondingly.

Furthermore, a tension wire 11 is provided according to FIG. 1 for stretching the protective skin 2 in the ridge area of the gable roof that is formed by the protective skin 2. Additionally, another tension wire 12, as well as tension wires provided in the area of the attachments 7 can be arranged in a not illustrated manner for stretching the protective skin 2. Preferably, a hail net 9, for instance, is stretched on the tension wires 11 and 12, and the protective skin 2, or the sheets 3 are attached to it.

Particularly with the aid of the stretching device 8, or the tension wires 1, 12, the protective skin 2 is embodied in the shape of a gable roof over the plants 4. FIG. 2 shows the intended further development of the weather protection device according to the invention as a broken line.

A gable roof is arranged over each plant row in a non-illustrated manner. According to the invention, numerous gable roofs can extend across the total surface of a corresponding cherry tree plantation, or such. Furthermore, the weather protection device can be extended in longitudinal direction accordingly so that a plant row is comprised of numerous plants 4.

Furthermore, FIG. 2 indicates an additional attachment 7 that largely prevents a complete back tilting of the protective skin 2, or of the sheets 3 so that they swivel back into an idle position according to FIG. 1 due to their own weight during comparably windless phases, or a calm.

FIG. 2 additionally shows that the protective skin 2, or the sheets 3 can rest on a hail net 9, or is supported by the same. In a special variation of the invention, a common hail protection system including the hail net 9 is used, whereby the sheets 3, or the protective skin 2 is sewn on, or glued on preferably lengthwise along its upper edge areas, or attached in a comparable manner. The attachment 7 can be realized in the same way. As a result the weather protection system according to the invention can be attached to already widely used hail protection systems merely at a relatively small additional effort.

For example, a pole 10 may have a clearance of approximately 4 m so that currently used cherry trees 4 are to be arranged underneath the protective skin 2 according to the invention. The attachments 7 are arranged at a distance of, for instance, several meters from each other, possibly approximately 10 m from each other. The length of the sheets 3 is adjusted mainly to the length of the plant rows, and can possibly be more than 100 m total. The width of the sheets 3 is preferably several dozens of centimeters, for instance, approximately 30 cm to 1 m. Advantageously, the overlap 5 has only a few centimeters, particularly approximately 5 to 10 cm.

Generally, weather protection devices are also possible that are embodied according to the invention, for instance, as tents, sun umbrellas or rain umbrellas, pavilions, or such with at least a partially pivoting protective skin 2, or sheets 3. For example, in umbrella-shaped weather protection devices, the sheets 3 are mainly embodied as truncated cone shaped rings, which preferably consist of flexible material.

In a particularly simple variation of the carrier unit 1, it usually has only poles 10, or rods 10 with the tension wires 11, or tension ropes 11. This means that the stretching device 8 and the tension wire 12 can be omitted. In this variation of the invention, the complete protective skin 2 can nearly freely hang between the plants, or the plant rows together with the hail net 9, and can largely blow freely in the wind, or be moved by the same. This largely reduces the efforts for realizing the invention without adversely influencing the advantageous functionality.

Generally, the poles 10, or rods 10 consisting of, for instance, wood, plastic, metal, especially aluminum or steel, and/or reinforced concrete can be used. They are possibly attached directly into the ground. As an alternative, the poles 10, or rods 10 can also be inserted into cores or such, that are attached in the ground so that a protection from ground moisture, or a rotting of the poles 10, or rods 10 near the ground level can be achieved. Furthermore, a relatively simple assembly and disassembly of the weather protection device according to the invention can be realized in this manner.

Generally, in addition to protecting moisture or sunlight sensitive specialized cultures 4 of plant cultivation, a weather protection device according to the invention particularly can also be used for the protection of buildings, or of other weather sensitive objects, building wall work on scaffolding, and/or the protection of animals from moisture or sunlight. It is possible to use the object to be protected as a component of the carrier unit, which further reduces the efforts for realizing the weather protection device according to the invention.

What is claimed is:

1. A weather protection device for the protection of moisture or sunlight sensitive specialized cultures of plant cultivation, comprising:
    a protective cover; and
    a carrier unit having a netlike structure,
    wherein the protective cover comprises a plurality of protective cover elements,
    wherein a majority of the protective cover elements overlaps with another of the plurality of protective cover elements,
    wherein each of the protective cover elements is disposed on top of the netlike structure,
    wherein each of the protective cover elements is attached to the netlike structure, and
    wherein each of the protective cover elements of the weather protection device pivots with respect to the carrier unit such that atmospheric air causes each of the protective cover elements to swivel out from the netlike structure from an idle position.

2. The device according to claim 1, wherein each of the protective cover elements is sewn or glued to the netlike structure.

3. The device according to claim 1, wherein the protective cover is comprised of a flexible material.

4. The device according to claim 1, wherein each of the protective cover elements is a rectangular shape.

5. The device according to claim 1, wherein at least one longitudinal edge of each of the protective cover elements is attached to the netlike structure.

6. The device according to claim 1, wherein each of the protective cover elements pivots along a pivot line that extends in a substantially horizontal direction.

7. The device according to claim 1, wherein the carrier unit comprises a return means for returning each of the swiveled out protective cover elements to their respective idle position.

8. The device according to claim 1, wherein each of the protective cover elements pivots along a pivot line that is arranged at an edge area of the protective cover elements.

9. The device according to claim 7, wherein the return means is comprised of at least one attachment element for attaching each of the protective cover elements to the carrier unit.

10. The device according to claim 1, wherein the carrier unit is comprised of a support device to support at least one of the protective cover elements.

11. The device according to claim 1, wherein each of the protective cover elements is attached to at least one of the netlike structure and the carrier unit with a thread, yarn, rope, and/or wire.

12. The device according to claim 1, wherein at least one of the protective cover elements comprise a material that permits light to pass.

13. The device according to claim 1, wherein the protective cover has a substantially peak shape.

* * * * *